J. A. KOLBY, L. P. LARSEN & C. P. NEILSEN.
RESILIENT WHEEL.
APPLICATION FILED MAR. 14, 1918.
1,286,348.
Patented Dec. 3, 1918.
2 SHEETS—SHEET 1.
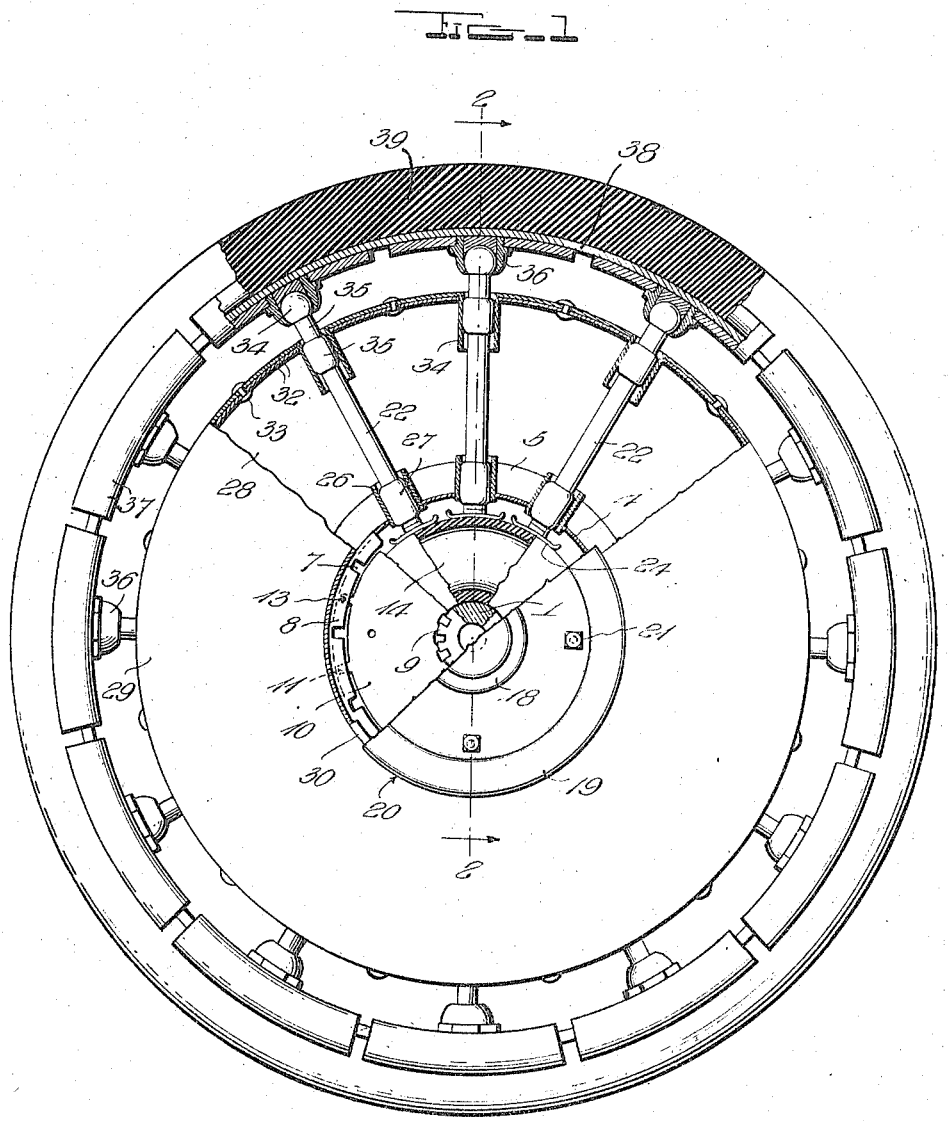
Witness
Inventors
James A. Kolby, Louis P. Larsen
Christian P. Neilsen
By
Attorneys

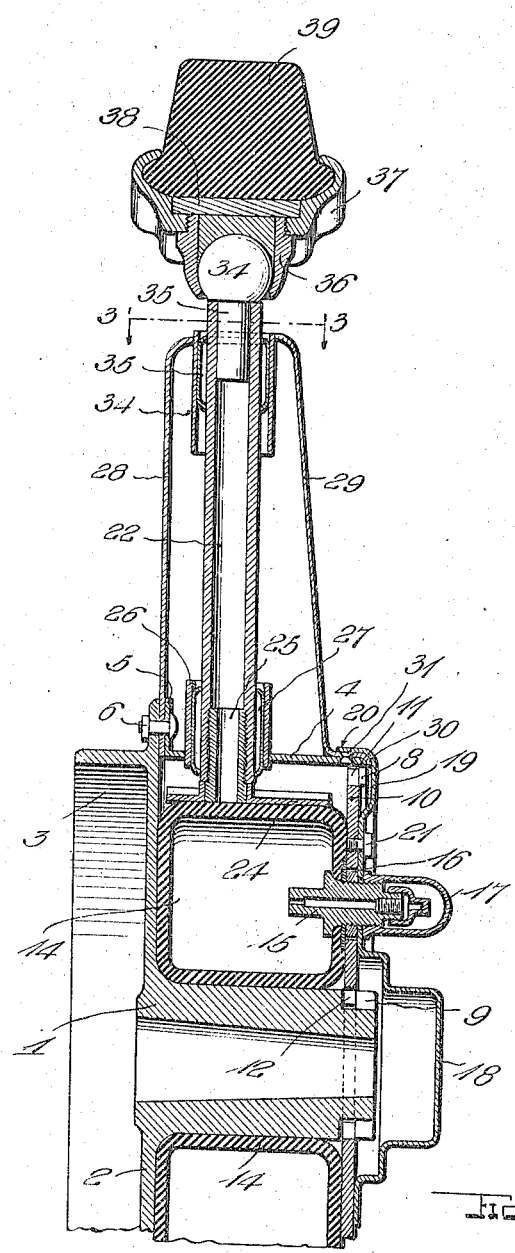

UNITED STATES PATENT OFFICE.

JAMES A. KOLBY, LOUIS P. LARSEN, AND CHRISTIAN P. NEILSEN, OF EPHRAIM, UTAH, ASSIGNORS TO KOLBY WHEEL COMPANY, OF EPHRAIM, UTAH.

RESILIENT WHEEL.

1,286,348.            Specification of Letters Patent.            Patented Dec. 3, 1918.

Application filed March 14, 1918. Serial No. 222,395.

*To all whom it may concern:*

Be it known that we, JAMES A. KOLBY, LOUIS P. LARSEN, and CHRISTIAN P. NEILSEN, citizens of the United States, residing at Ephraim, in the county of Sanpete and State of Utah, have invented certain new and useful Improvements in Resilient Wheels; and we do declare the following to be a full, clear, and exact description of the invention, such as will enable others skilled in the art to which it appertains to make and use the same.

Our invention relates to that class of vehicle wheels employing radially slidable spokes and a pneumatic cushion for controlling the inward movement thereof; and one object of the invention is to provide a simple and comparatively inexpensive structure which will readily permit the cushion or tube to be replaced when necessary.

A further object is to reinforce the wheel by the provision of a pair of side disks disposed on opposite sides of the spokes and having guides at their peripheral edges through which said spokes slide.

A still further object of the invention is to form the rim of the wheel of a plurality of arcuate sections and to connect these sections with the spoke by means of ball and socket joints, so that universal movement of the several rim sections is permitted to allow the tire to readily adapt itself to all road conditions.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a side elevation of the improved wheel with parts removed and in section;

Fig. 2 is a vertical transverse section on the plane of the line 2—2 of Fig. 1;

Fig. 3 is a detail section on the plane indicated by the line 3—3 of Fig. 2;

Fig. 4 is an outer end view of the drum;

Fig. 5 is a side elevation of the removable side plate which coacts with the drum, the wheel hub, and a flange of this hub in forming a casing for the pneumatic tube; and Fig. 6 is a detail elevation partly in section showing more particularly the manner in which the center of the aforesaid side plate is connected to the hub.

In the drawings above briefly described, the numeral 1 designates a preferably cylindrical hub whose inner end is provided with an integral outstanding annular flange 2 which may well carry the brake drum 3 if the wheel is to be used as a driver. A metal drum 4 surrounds the hub 1 in spaced relation therewith and the inner end of said drum is stamped outwardly to form an annular flange 5 which is rigidly secured to the flange 2 by bolts or the like 6. The outer end of drum 4 is formed with circumferentially spaced notches 7 and the metal between these notches is stamped inwardly to provide a plurality of abutments 8. The outer end of the hub 1 is also equipped with circumferentially spaced abutments 9, the two series of abutments 8—9 serving to removably hold a side ring or plate 10 within the outer end of the drum 4. The periphery of plate 10 is formed with projecting circumferentially spaced teeth 11 coöperating with the abutments 8, while similar teeth 12 are formed at the center of the plate in question for coaction with the abutments 9. When the plate 10 is turned sufficiently, its teeth 11 and 12 may be moved between the abutments to permit either attachment or detachment of the plate, but ordinarily the teeth in question bear against the inner sides of said abutments and thus hold the plate 10 securely in place. In most cases, screws or the like 13 will be provided for normally holding the plate 10 against turning.

The hub 1, flange 2, drum 4 and side plate 10 coöperate in forming a casing for the pneumatic tube 14 which is of unusually heavy construction as shown, said tube being provided with an inflation valve 15 extending through an opening 16 in the side plate 10, the outer end of said valve being provided with an appropriate guard cap 17. The hub cap 18 is stamped from sheet metal and extends as at 19 to form a circular guard to completely seal the outer end of the drum 4 in such a manner as to exclude foreign matter, the peripheral edge of the guard 19 being stamped inwardly to provide a flange 20. The cap 17 assists in holding the parts 18—19 in place, but cap screws 21 will by preference be also employed.

Tubular spokes 22 formed of metal are provided on their inner ends with shoes 24 which bear against the periphery of the pneumatic tube 14, said shoes being preferably connected to the spokes by providing them with stems 25 which are threaded in the inner ends of said spokes. Tubular guides 26 are carried by the drum 4 and the spokes 22 pass loosely through these guides, said spokes being surrounded by resilient metal sleeves 27 which are spaced slightly therefrom, the sleeves in question snugly engaging the guides 26 and having their ends bent inwardly and secured to the spokes, thus not only guiding the movement of the latter, but preventing the entrance of possibly injurious matter into the casing of the tube 14.

To brace the spokes 22, inner and outer side disks 28 and 29 are provided, the center of the inner disk 28 being secured to the flange 2 by means of the fasteners 6, while the inner edge of the outer disk 29 is stamped outwardly and vertically to form a flange 30 secured by rivets or the like 31 to the outer end of the drum. The peripheral edges of the disks 28 and 29 are stamped inwardly to form overlapping flanges 32 which are secured together by rivets or other suitable fasteners 33, said flanges carrying tubular spoke guides 34 in which packing sleeves 35 similar to the sleeves 27 are located to exclude foreign matter from the casing formed by the two disks in question. These disks not only brace the wheel against lateral strain, but since they move bodily with the hub, 1, they form an effective driving connection between said hub and the spokes.

At the outer end of each spoke 22, a ball 34 is disposed, each of said balls having a neck 35 snugly received in the outer end of the adjacent spoke. The balls 34 are received in suitable sockets 36 carried by the arcuate sections 37 of which the wheel rim is constructed, said sections however being tied together by a flexible metal band 38. The tire 39 is preferably of the cushion or solid type.

By employing the ball and socket connections 34—36 between the spokes and rim sections, the latter and their tires 39 may have practically universal movement to readily adapt them to all road conditions, this being a highly advantageous feature.

From the foregoing, taken in connection with the accompanying drawings, it will be obvious that although our invention is of comparatively simple and inexpensive nature, it will be highly efficient and durable. Whenever it is advisable to replenish the supply of air in the tube 14, it is simply necessary to remove the cap 17, thus giving access to the inflation valve 15, and if the tube must be removed for repairs or to permit the installation of a new one, this can readily be done by first deflating the tube, then removing the cap 18—19, and finally turning the side plate 10 by a spanner wrench or the like so that the teeth 11 and 12 thereof may pass outwardly through the spaces between the abutments 8 and 9. The rim structure is exceedingly advantageous for the reasons above set forth and since the tire is formed in sections, injury to one section may be rectified without interfering with the others. Since probably the best results are obtained from the several details shown and described, we prefer to employ these details, but within the scope of the invention as claimed, numerous minor changes may well be made.

We claim:—

1. A resilient wheel comprising a hub having at its inner end an annular outstanding flange, a drum surrounding said hub in spaced relation thereto and rigidly secured at its inner end to said flange, the outer end of said drum having inwardly extending circumferentially spaced abutments, a removable side plate having peripheral circumferentially spaced teeth bearing against the inner sides of said abutments and movable outwardly between them when said plate is sufficiently turned, whereby to permit detachment of said plate; said hub, flange, drum and plate coacting to form a tube casing, and a pneumatic tube in said casing having an inflation valve extending through said side plate; together with shoes bearing on the periphery of said tube, spokes radiating from said shoes and passing slidably through said drum, and a rim on the outer ends of said spokes.

2. A structure as specified in claim 1, said drum being formed of metal with its inner end provided with an outwardly stamped flange by means of which it is secured to said hub flange, the outer end of said drum having circumferentially spaced notches, and the metal between said notches being bent inwardly on radial lines to form the aforesaid abutments.

3. A structure as specified in claim 1, together with a pair of fixed side disks on opposite sides of said spokes and extending from the ends of said drum into inwardly spaced relation with said rim, the peripheral edges of said disks being stamped inwardly and forming overlapping flanges which are secured together, said flanges having openings through which said spokes pass slidably.

4. A resilient wheel comprising a rim, a dust proof casing surrounded thereby, spokes connected to the rim and passing slidably into said casing, cushioning means for said spokes located in said casing, tubular guides through which said spokes pass loosely, and resilient metal sleeves surrounding said spokes in spaced relation thereto and having their ends bent inwardly and secured to said spokes, said sleeves fitting snugly yet slidably into said tubular guides to exclude foreign matter.

5. A resilient wheel comprising a hub having on its inner end an annular outstanding flange, a cylindrical drum surrounding said hub in spaced relation thereto and secured at its inner end to said flange, a removable plate closing the outer end of said drum and forming with said drum and flange a casing, a pneumatic tube in said casing around said hub, shoes between said drum and tube and bearing on the latter, said drum having guide openings adjacent said shoes, spokes sliding at their inner ends through said openings and secured to said shoes, a pair of spoke bracing disks disposed on opposite sides of said spokes and secured rigidly to said casing, the edges of said disks being located near the outer ends of the spokes and having guide openings through which said spokes slide, a plurality of arcuate rim sections mounted for universal movement on said outer ends of the spokes, a metal band surrounding said rim sections, and a cushion tire mounted on said band.

In testimony whereof we have hereunto set our hands in the presence of two subscribing witnesses.

JAMES A. KOLBY.
LOUIS P. LARSEN.
CHRISTIAN P. NEILSEN.

Witnesses:
ANTHONY THORPE,
HARRIS TAYLOR.

Copies of this patent may be obtained for five cents each, by addressing the "Commissioner of Patents, Washington, D. C."